United States Patent
Eigenbrodt et al.

(10) Patent No.: US 8,059,301 B2
(45) Date of Patent: Nov. 15, 2011

(54) SYSTEMS AND METHODS FOR MASS PRINTING

(75) Inventors: Martin Eigenbrodt, Eppelheim (DE);
Andreas Lammers, Freising (DE);
Jens-Michael Ruppelt, Bad Blankenburg (DE)

(73) Assignee: SAP AG, Walldorf (DE)

( * ) Notice: Subject to any disclaimer, the term of this patent is extended or adjusted under 35 U.S.C. 154(b) by 1397 days.

(21) Appl. No.: 11/239,078

(22) Filed: Sep. 30, 2005

(65) Prior Publication Data
US 2006/0173973 A1      Aug. 3, 2006

Related U.S. Application Data

(60) Provisional application No. 60/614,359, filed on Sep. 30, 2004.

(51) Int. Cl.
*G06K 15/00* (2006.01)
(52) U.S. Cl. .................................. 358/1.18; 358/1.13
(58) Field of Classification Search .............. 358/1.15, 358/1.18; 707/999.003; 705/10
See application file for complete search history.

(56) References Cited

U.S. PATENT DOCUMENTS

| | | | |
|---|---|---|---|
| 5,710,900 A * | 1/1998 | Anand et al. .................. | 715/764 |
| 7,383,251 B2 * | 6/2008 | Might ................................. | 1/1 |
| 2002/0035504 A1 * | 3/2002 | Dver et al. ...................... | 705/10 |
| 2004/0117731 A1 * | 6/2004 | Blyashov ...................... | 715/507 |

* cited by examiner

*Primary Examiner* — Twyler Haskins
*Assistant Examiner* — Lennin Rodriguez
(74) *Attorney, Agent, or Firm* — Finnegan, Henderson, Farabow, Garrett & Dunner, LLP

(57) ABSTRACT

Systems and methods are provided for generating mass reports. In one implementation, a graphical user interface (GUI) or web interface is provided that enable a user to run an analysis and generate reports. The user may run software on a computer workstation to access a network or, alternatively, may use a Internet browser to navigate to a web site providing access to network resources. The user at a computer workstation may input parameters to generate reports that, for example, provide summaries of data and/or analyze raw data. Furthermore, users may control the timing of report execution and/or the distribution of the reports. Reports may be distributed in electronic and/or hard copy format.

17 Claims, 5 Drawing Sheets

SYSTEMS AND METHODS FOR MASS PRINTING

RELATED APPLICATION

This application claims the benefit of priority from U.S. Provisional Application No. 60/614,359, entitled "Mass Printing Engine," filed on Sep. 30, 2004, the disclosure of which is expressly incorporated herein by reference to its entirety.

BACKGROUND

I. Technical Field

The present invention generally relates to the field of data processing and to systems and methods for generating mass reports. More particularly, the invention relates to computerized systems and methods for generating mass reports and report tapes or files that may be generated based upon user-defined report parameters.

II. Background Information

In today's information intensive environment, companies must manage a large volume of data to conduct business. Employees often must analyze large volumes of data to produce reports, particularly in the financial field. Due to the large amount of data, many companies have expanded their reliance on electronically stored data and, as a result, use databases to meet this increasing challenge.

Modern servers and networks allow companies to distribute large amounts of data to employees at various locations. However, due to the volume of data that is stored electronically, companies often are presented with a significant challenge when distributing the data because companies increasingly want to allow employees to share large volumes of data, both in electronic and hard copy form.

For example, employees may wish to distribute data in an electronic format, such as a PDF (portable document format) file so that the data may be viewed but cannot be altered. Still further, employees may wish to print reports, such as financial reports or analysis, as hard copies. At any give time, a large organization company may have a thousand or more large print jobs. Such a large volume may occur because employees may be required to print many variations of reports, particularly in the area of financial analysis. Also, employees may wish to convert the reports into a PDF file for later viewing when, for example, an employee is able to access a document away from the office or when visiting a client. As a result, a large business may require a significant amount of computing resources to manage the large volume of print jobs.

However, since employees are often located at personal computers, processing resources are limited. For example, a large report may take a typical personal computer a significant amount of time to generate. While the report is being generated, the user may be unable to work on other tasks. Furthermore, printers in an office may be limited and may not have enough memory to process a large print job.

In view of the foregoing, there is a need for systems, methods, and computing tools that effectively and efficiently assist in the management, generation, and distribution of print jobs, including mass print jobs. Moreover, there is a need for such solutions that can address different processing needs, including whether an employee wishes to print hard copies of reports or would rather distribute or store the reports in electronic format, such as a PDF file.

SUMMARY

Consistent with an embodiment of the present invention, a computer-implemented method is provided for mass printing using a data processing system. The method comprises electronically receiving a selection of parameters specifying a report; electronically retrieving, from a database, mass data to generate the report; and transferring a process to a server, wherein the server generates the report using the mass data according to the selected parameters.

Consistent with another embodiment of the present invention, a system for mass printing is provided. The system comprises a graphical user interface, the graphical user interface enabling a user to make a selection of parameters specifying a report; a database storing mass data; a first server that retrieves the mass data from the database; and a second server that generates a report using the mass data according to the selected parameters.

Consistent with yet another embodiment of the present invention, a computer readable medium is provided. The computer readable medium comprises programmable instructions adapted to perform a computer-implemented method for mass printing using a data processing system. The method comprises electronically receiving a selection of parameters specifying a report; electronically retrieving, from a database, mass data to generate the report; and transferring a process to a server, wherein the server generates the report using the mass data according to the specified parameters.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
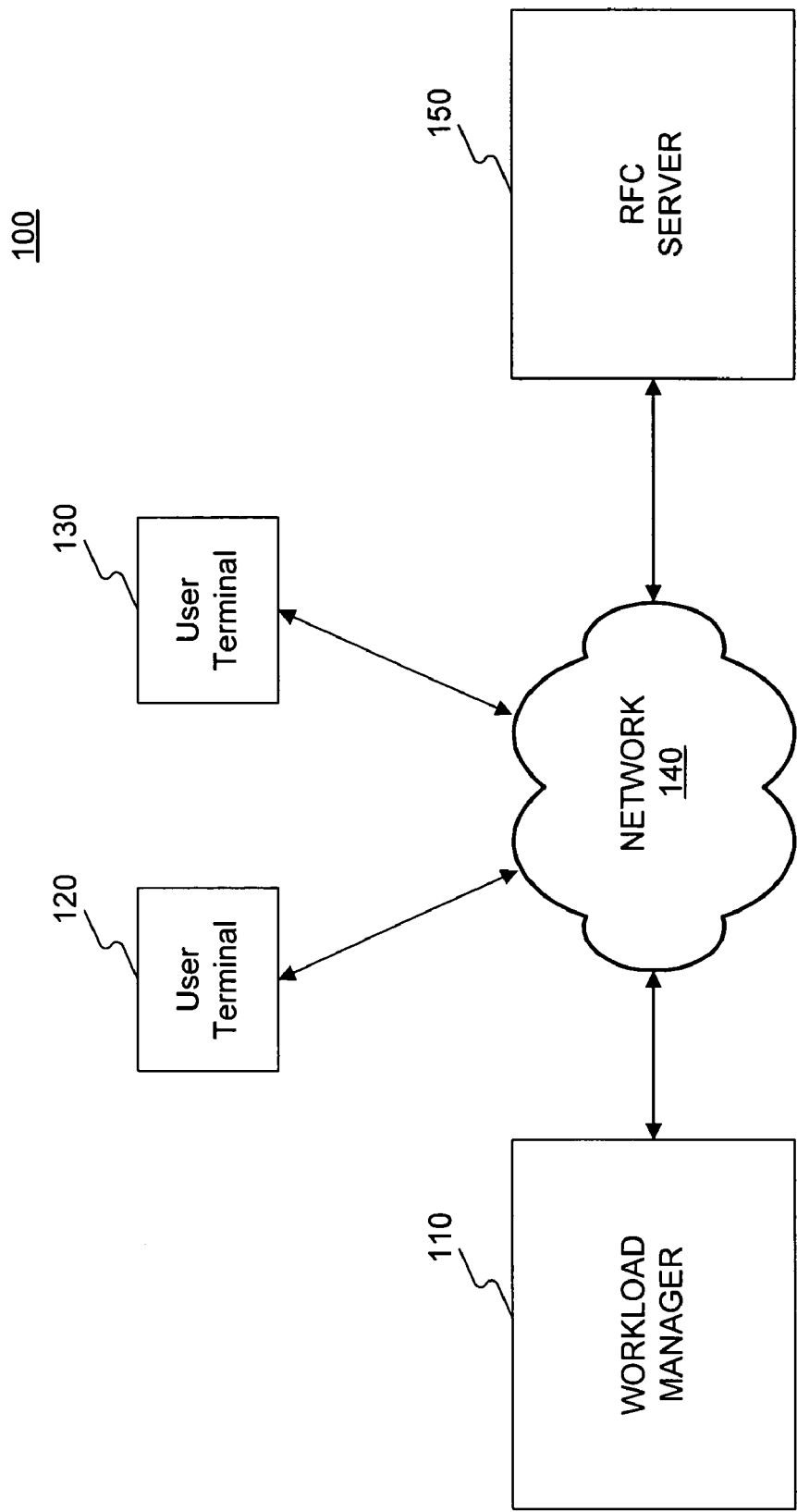
FIG. 1 illustrates an exemplary system for providing mass printing, according to an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention provide users with the ability to effectively and efficiently assist in the management, generation, and distribution of print jobs, including mass print jobs. As used herein, the term "print" or "printing" job refers not only to the process of generating a printed document (i.e., a hard copy or paper copy), but also the generation of electronic copies or files, including electronic documents that are formatted consistent with known formats (e.g., PDF, etc.).

Embodiments of the invention includes systems and methods that provide a graphical user interface (GUI) or web interface that is accessible to a user to run analysis and generate reports. As used herein, the term "report" refers to a document used to disseminate information, which may be created as a result of a query or user specifications. Reports may include text, data, graphics, and calculations. Reports may be presented in various forms and formats, including spreadsheets, tables, and the like. As disclosed herein, a user may run software on a computer terminal to access a network or, alternatively, may use a Internet browser to navigate to a web site that provides access to network resources. For example, a user may access a web site, supply a user name and password, and gain access to network resources through a web portal. A user at a computer terminal that accesses the network resources may input parameters to generate reports that provide, for example, summaries of data and/or analyze raw data. Furthermore, users may also control timing of report execution and schedule the distribution of the reports. In particular, users may schedule a report to be generated at a specified time, generate a report when desired, and specify the format of the report. Reports may be distributed in electronic or hard copy form. For example, print jobs can be merged to a PDF file and/or stored in a server or a memory.

In accordance with embodiments of the invention, a user may also access a GUI or web interface to specify parameters that are used to generate a report. The reports may be generated through the use of one or more software modules, including commercially available software such as Microsoft Excel. When Microsoft Excel is used as a software module for generating a report, Microsoft Excel may create or print a PostScript file to a predetermined directory of a server or to a memory. Furthermore, according to the present invention, remote control of a computer running Microsoft Excel and connected to a network may be provided so that the remote computer may be used to run and manage reports that are created using data stored in a database that is connected to and/or accessible over the network.

As further disclosed herein, embodiments consistent with the present invention may be implemented to generate mass reports, as well as report tapes or files. As used herein, the term "mass reports" refers to reports that are generated using mass or large quantities of data. Examples of mass reports including financial reports for large organizations, which may be produced according to a schedule, such as by month, quarter, or year, for example. Other examples of mass reports include statistical data describing an organization's performance in other areas not limited to finances, such as, for example, productivity. Accordingly, embodiments of the present invention be used with various solutions and within numerous environments. By way of example, embodiments of the invention may be implemented in computerized systems or methods that incorporate business warehouse solutions from SAP AG (Walldorf, Germany).

In accordance with one embodiment, the solution comprises a web interface that is based on standard SAP development tools and a preliminary calculation service. The preliminary calculation service provides parameters from which a user may select to specify how many reports should be generated, how to generate each report, and how many documents to create. As used herein, the term "precalculation" refers to the formatting of, for example, an OLAP (Online Analytical Processing) request on the data and the formatting of the Microsoft Excel reports. An OLAP request may use a category of software tools that provides analysis of data stored in a database. Further, OLAP tools may allow a user to analyze different dimensions of multidimensional data. Accordingly, a user may generate reports as desired and schedule the distribution of the reports.

FIG. 1 illustrates an exemplary system 100 for providing mass printing, consistent with an embodiment of the present invention. As shown in system 100, a workload manager 110 is provided that manages requests from users at a plurality of terminals 120-130 (two terminals are depicted in FIG. 1, but any number of terminals may be provided). Workload manager 110 and terminals 120-130 are connected to a network 140. Network 140 provides communications between the various entities in system 100, such as terminals 120-130, workload manager 110, and an RFC server 150, which is described in further detail below. In addition, workload manager 110 may access legacy systems (not shown) via network 140, or may directly access legacy systems and/or databases. Network 140 may be a shared, public, or private network and encompasses a wide area or local area. Furthermore, network 140 may be implemented through any suitable combination of wired and/or wireless communication networks. Further, network 140 may comprise a local area network (LAN), a wide area network (WAN), an intranet, or the Internet.

Terminals 120-130 may be any type device for communicating with workload manager 110 over network 140. For example, terminals 120-130 may be personal computers, handheld devices, or any other appropriate computing platform or device capable of exchanging data with network 140. Further, terminals 120-130 may execute software that provide one or more GUIs for interacting with network resources and/or a web browser for accessing network resources through a web portal. Users may access workload manager 110 via network 140 through a web browser or software running on, for example, any one of terminals 120-130. A web portal may include options for allowing a user to log onto a secure site by supplying credentials, such as a username and a password. Once logged onto the site, the web portal may display a series of screens prompting the user to make various selections for generating and scheduling reports. Since embodiments of the present invention may be implemented using an HTTPS (hypertext transfer protocol secure) environment, data transfer over a network, such as the Internet, is secured.

Consistent with an aspect of the present invention, a web interface displayed to users of terminals 120-130 may provide users with various options. For example, a user may select, using the web interface, from a hierarchically-structured display of settings, such as settings specifying parameters to include in a report. The web interface may also display reports that are assigned to a user. For example, a user may select one or more reports using a search string, by choosing hierarchy nodes in the user's favorites directory, and vary the reports in hierarchies.

Using the web interface, a user may also save user-specific variants for selecting reports and report parameters. Variation functionality provided by embodiments of the present invention may enable users to define a hierarchy for a certain characteristic. For example, not only can reports from the top node of a hierarchy be print, but also reports from levels below. A user may also integrate parameterization (variable input) for selected reports with, for example, a standard SAP business warehouse variable screen that is called up with web application program interfaces (APIs). Web APIs may be implemented to realize a "melting of variables" function. By "melting of variables," it is meant that several queries can use the same parameters, such as individual parameters having the same name. A user may use one parameter to specify all instances of a variable. Further, using the web interface, a user may register reports in a sub-screen to designate a print job that has an assigned printing time.

In order to manage and distribute print jobs, workload manager 110 may distribute, schedule, and/or invoke reports when needed or requested by users at terminals 120-130. Since workload manager 110 is connected to network 140, users at terminals 120-130 do not need to have any specialized software because the user may access data over network 140. For example, workload manager 110 may distribute reports for calculation using commercially available software, such as Microsoft Excel, and then distribute the reports to preliminary calculation services that are available. These preliminary calculation services may be remote-controlled Microsoft Excel instances, which are performed by remote function call (RFC) server 150 (see FIG. 1). A setting can be made to specify how many preliminary calculation instances a user can allocate for his or her request. Such requests may be processed at the same time using parallel processing techniques, consistent with embodiments of the present invention.

In one embodiment, RFC server 150 is connected to network 140 and receives print parameters transferred from workload manager 110. RFC server 150 may execute multiple pre-calculation instances at the same time, perform PDF conversion and merging, transfer PDF files into a user's favorites directory, and transmit a notification of a new file, such as a PDF file, to a user. In particular, RFC server 150 may pre-calculate workbooks using data supplied by workload manager 110. As used herein, a "workbook" refers to a data set, such as a set of data stored in a format specified by a spreadsheet program application, such as Microsoft Excel. A workbook may also include a data set stored in any other appropriate format such as, for example, according to a database format.

In an exemplary embodiment, a BEx Analyzer, a standard SAP product, executes on RFC server 150 and uses command sequences that are transferred during a preliminary calculation. Preliminary calculation capacities may be based on existing products or methods delivered as part of, for example, components of a BEx Broadcaster, a standard SAP product. Pre-calculated workbooks may be stored in a temporary directory in RFC server 150, for example.

After preliminary calculation(s), the documents are converted into an output format, such as PDF files. In the example of Microsoft Excel workbooks, XLS files (Excel spreadsheet documents) are converted into a specified format, such as a PDF file, and the workbooks are merged. In one embodiment, the generation of PDF files is accomplished through the use of PostScript printer description language provided by Adobe Acrobat. PDF files may be created with Adobe Acrobat or other programs, and can be viewed with Adobe Acrobat Reader and other PDF reader programs. Once documents are converted into PDF files, the documents may be grouped automatically in a report tape or file. The report tape or file may be forwarded to a user in, for example, his or her favorites directory as a PDF file. In one embodiment, the user is informed by an e-mail sent over network 140 that the report or document is available.

Figure 2:
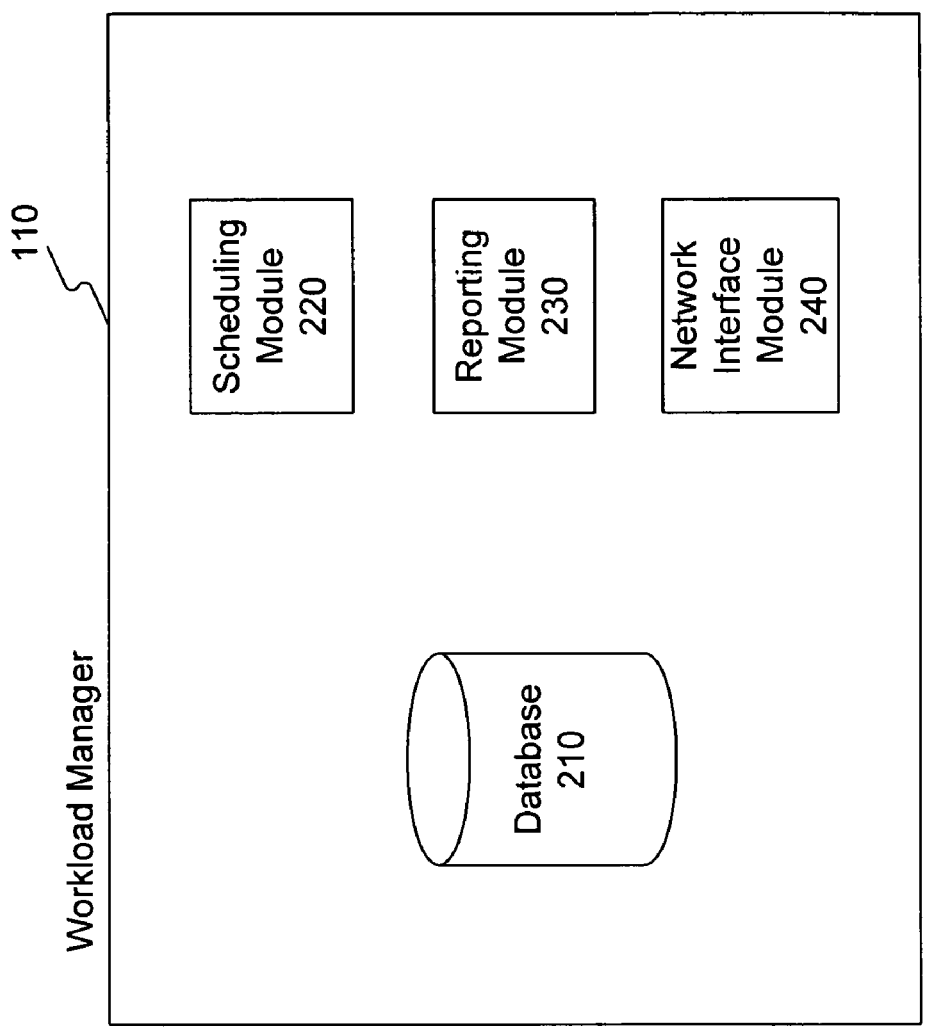
FIG. 2 illustrates an exemplary diagram of a workload manager for implementing mass printing, consistent with an embodiment of the present invention.

FIG. 2 illustrates an exemplary diagram of workload manager 110 for implementing mass printing, consistent with an embodiment of the present invention. As shown in FIG. 2, workload manager 110 may include a database 210, a scheduling module 220, a reporting module 230, and a network interface module 240. These modules provide functionality for workload manager 110 to manage, schedule, and generate reports through the use of, for example, pre-calculation services provided by RFC server 150. In one embodiment, database 210 stores data relating to a company or a project, and is updated in real-time with information received over network 140 (cf. FIG. 1). Database 210 may also be updated with information from legacy systems that communicate with workload manager 110 over network 140. In other embodiments consistent with the present invention, database 210 may be external to workload manager 110. Further, RFC server 150 may receive requests for generating reports from network interface module 240. Additionally, RFC server may return generated reports to workload manager 110 via network interface module 240.

Scheduling module 220 may be used by workload manager 110 to designate dates and times for generating reports according to an automated schedule. For example, an employee or other user may wish to generate a report according to particular parameters every week in order to update the report with the past week's date. Scheduling module 220 may manage such a process and transmit instructions for the report to RFC server 150 according to the user's schedule. Further, reporting module 230 may receive parameters and selections by a user specifying, for example, workbooks that a user wishes to use in generating a report. Report parameters may be transferred via network interface module 230 when appropriate or according to scheduling module 220.

Figure 3:
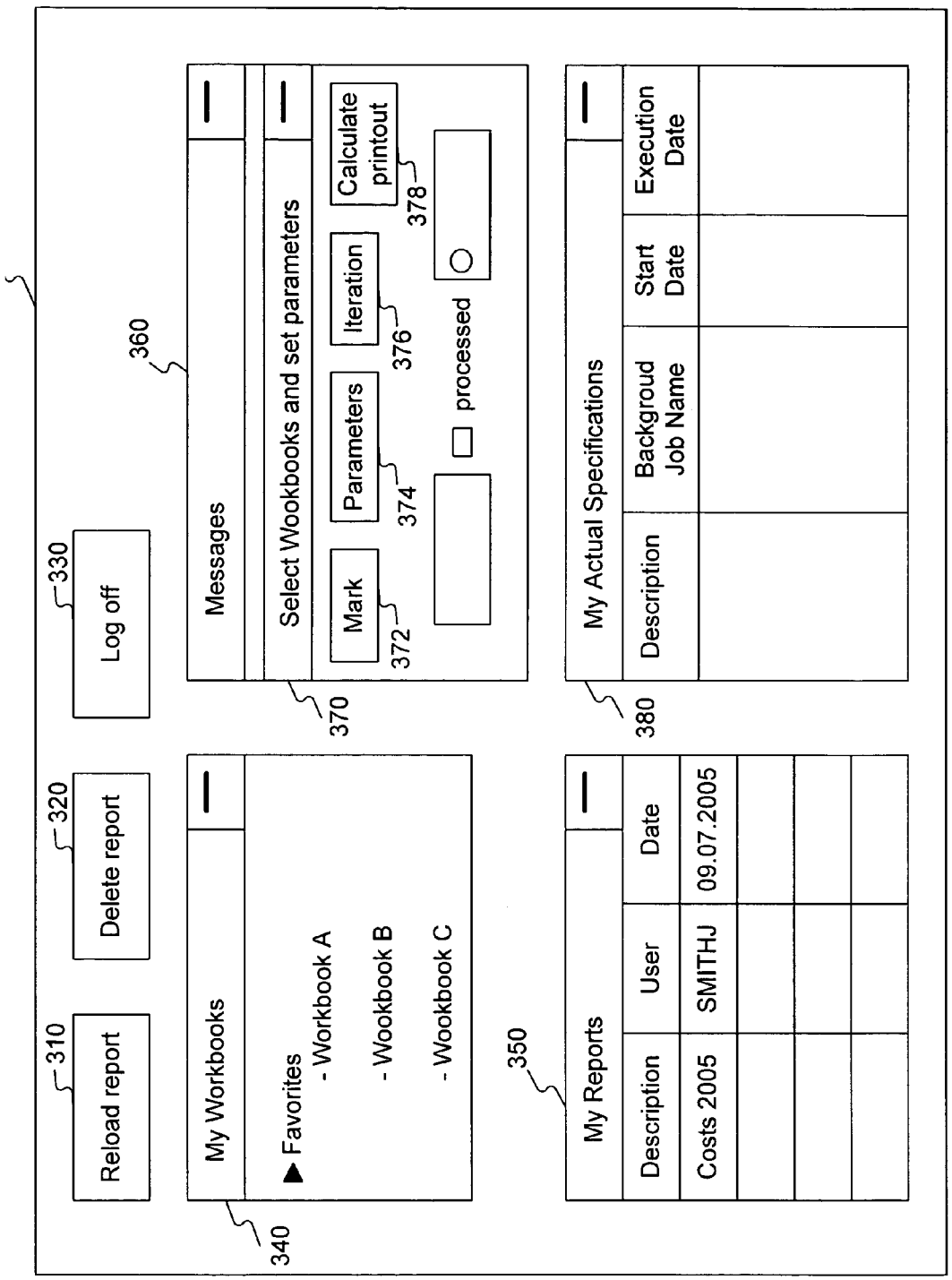
FIG. 3 illustrates an exemplary graphical user interface for generating reports and scheduling print jobs, consistent with an embodiment of the present invention.

FIG. 3 illustrates an exemplary graphical user interface (GUI) 300 for generating and scheduling print jobs, consistent with an embodiment of the present invention. GUI 300 may be displayed once a user logs onto a system, such as a business warehouse system provided by SAP, by submitting for authentication a user name and password, for example. In one embodiment, GUI 300 may display the user's roles and favorites directory, together with associated workbooks, saved reports, and/or current scheduled specifications for generating reports.

As illustrated in FIG. 3, GUI 300 may include a plurality of selectable buttons 310-330. Buttons 310-330 may be selected, for example, by a user operating a pointing device, such as a mouse. Although a mouse is given as an example of a pointing device, buttons 310-330 may be selected by any appropriate device or may be selectable using a touch screen (not shown). In the example of FIG. 3, GUI 300 includes a "reload report" button 310, a "delete report" button 320, and a "log off" button 330. The "reload report" button 310 may allow a user to reload a report previously deleted from a directory. Further, the "delete report" button 320 may allow a user to delete a report, and the "log off" button 330 may allow a user to exit from GUI 300.

GUI 300 may further include a "My Workbooks" section 340, which includes the user's favorites directory. The user's favorites directly may include, as shown in FIG. 3, workbooks associated with the user. GUI 300 also may include a "My Reports" section 350, which displays a list of available reports. Reports may be identified by description, user, and/or date. Further, GUI 300 may include a "Messages" section 360 for displaying electronic messages, for example. As shown in FIG. 3, "Messages" section 360 is not visible because it is covered by another section, but "Messages" section 360 may be selected by a user so that it appears fully visible.

Additionally, a "Select workbooks and set parameters" section 370 may allow a user to set parameters for generating a report. Functionality provided by the options listed in this section may allow a user to select workbooks and specify parameters to generate a report. Further, a "mark" button 272 allows a user to mark an entry to read from a parameter table, a "parameters" button 274 allows a user to specify parameters for the report, an "iteration" button 376 allows a user to view parameters specified for a current report selection, and a "calculate printout" button 378 provides a user with a calculation of the number of pages of a specified report. GUI 300 further includes a "My Actual Specifications" section 380 in which reports may be scheduled. Reports may be scheduled by a user for automatic generation. As shown in FIG. 3, reports may be identified by description, background job name, start date, and/or execution date.

Figure 4:
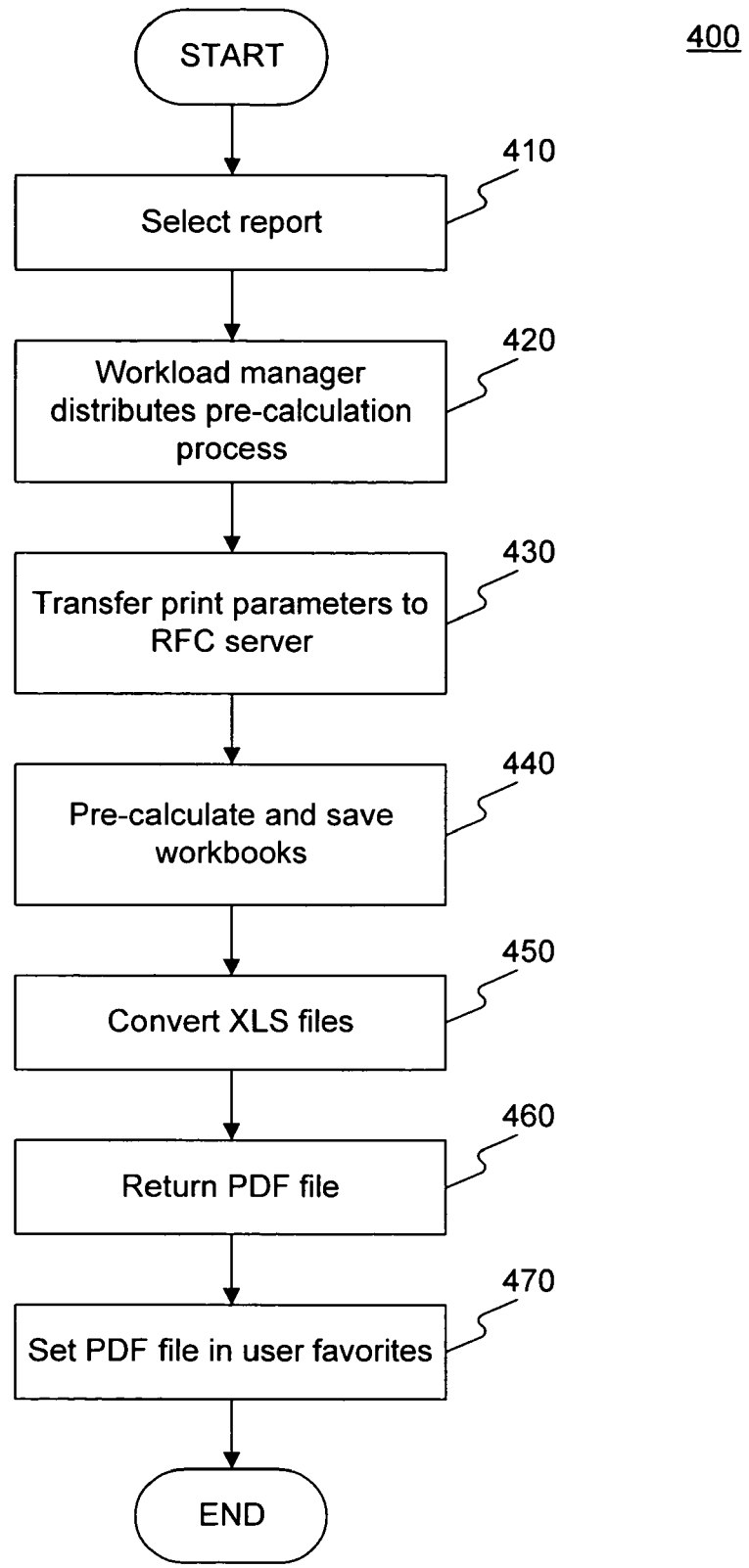
FIG. 4 is a flow diagram of an exemplary method for mass printing using a data processing system, consistent with an embodiment of the present invention.

Referring now to FIG. 4, a flow diagram 400 is provided of an exemplary method for mass printing using a data processing system, consistent with an embodiment of the present invention. A workload manager, such as workload manager 110, shown in FIG. 2, may be used in implementing the method of FIG. 4. For example, workload manager 110, may manage, schedule, and generate reports through the use of, for example, pre-calculation services provided by RFC server 150 using data stored in database 210.

At the start of the process, a user may select reports in a web application, flags them for printing, sets parameters for them, and/or varies them (step 410). As part of this step, a user interface (such as GUI 300 shown in FIG. 3) may be provided to prompt the user to make a selection from a plurality of workbooks, for example. Further, a user may be prompted to select parameters for a report. As used herein, the term "parameters" refers to a measurement or a value on which something else depends and may alter the presentation of a report. In one embodiment, when a user selects parameters for a report, the user may select and specify parameters that define the technical content of the report, including data fields that the report will contain and any calculations that are to be made on the data. Users also have the option of loading a report that has already been saved. Furthermore, any preexisting jobs that have already been scheduled by users may be executed at a specified start time.

Next, in step 420, workload manager 110 distributes a pre-calculation process. The pre-calculation process may be used to pre-calculate workbooks using data supplied by workload manager 110. In one embodiment, a standard RFC connection using, for example, an API is used to distribute the pre-calculation process. The pre-calculation process may be executed by a program or application of a server in the network (e.g., a business warehouse (BW) server or another server). In such as case, the server program may be registered under a connection type (e.g., TCP/IP (type T)).

In step 430, print parameters are transferred to RFC server 150. Print parameters may include specifications or information on how to format a report and whether the report should be prepared as, for example, a PDF file. The print parameters may also indicate whether a report should be saved to a user's favorites directory, or transmitted by e-mail. In one embodiment, the print parameters are transferred using a standard RFC connection using an API, such as the SAP API.

Next, in step 440, workbooks are pre-calculated and saved by RFC server 150. Workbooks may be pre-calculated using data supplied by workload manager 110. Preliminary calculation capacities may be based on existing products or methods delivered as part of, for example, components of a BEx Broadcaster, a standard SAP product.

In step 450, XLS files are grouped or given bookmarks and the workbooks are merged. In one embodiment, merged workbooks are saved in a protected server directory or in a temporary directory of a server. For example, workbooks may be stored in a temporary directory in RFC server 150 (shown in FIG. 1), for example.

In step 460, XLS files are converted into a PDF file. Generation of PDF files is accomplished through the use of PostScript printer description language provided by Adobe Acrobat. PDF files may be created with Adobe Acrobat or other programs, and can be viewed with Adobe Acrobat Reader and other PDF reader programs.

In step 470, the process returns a converted PDF document to the workload manger 110. Once documents are converted into PDF files, the documents may be grouped automatically in a report tape or file. The report tape or file may be forwarded to a user in, for example, his or her favorites directory as a PDF file. For example, workload manage 110, in step 480, sets the PDF documents in the user's favorites directory. Users may then access the PDF documents from terminals 120-130 over network 140. Alternatively, a user may receive an email message indicating that the PDF document is available in a particular directory.

Accordingly, consistent with the present invention, a user may select reports in a web application, flag them for printing, sets parameters for them, and/or vary them. A pre-calculation process may be used to pre-calculate workbooks using data may transfer print parameters. Workbooks are pre-calculated, saved, and/or merged, then converted into a file, such as a PDF file. After being converting into PDF file(s), the documents may be grouped automatically in a report tape or file that may be forwarded to a user. Users may retrieve the documents or receive an email notification of a storage location from which the documents may be retrieved.

Figure 5:
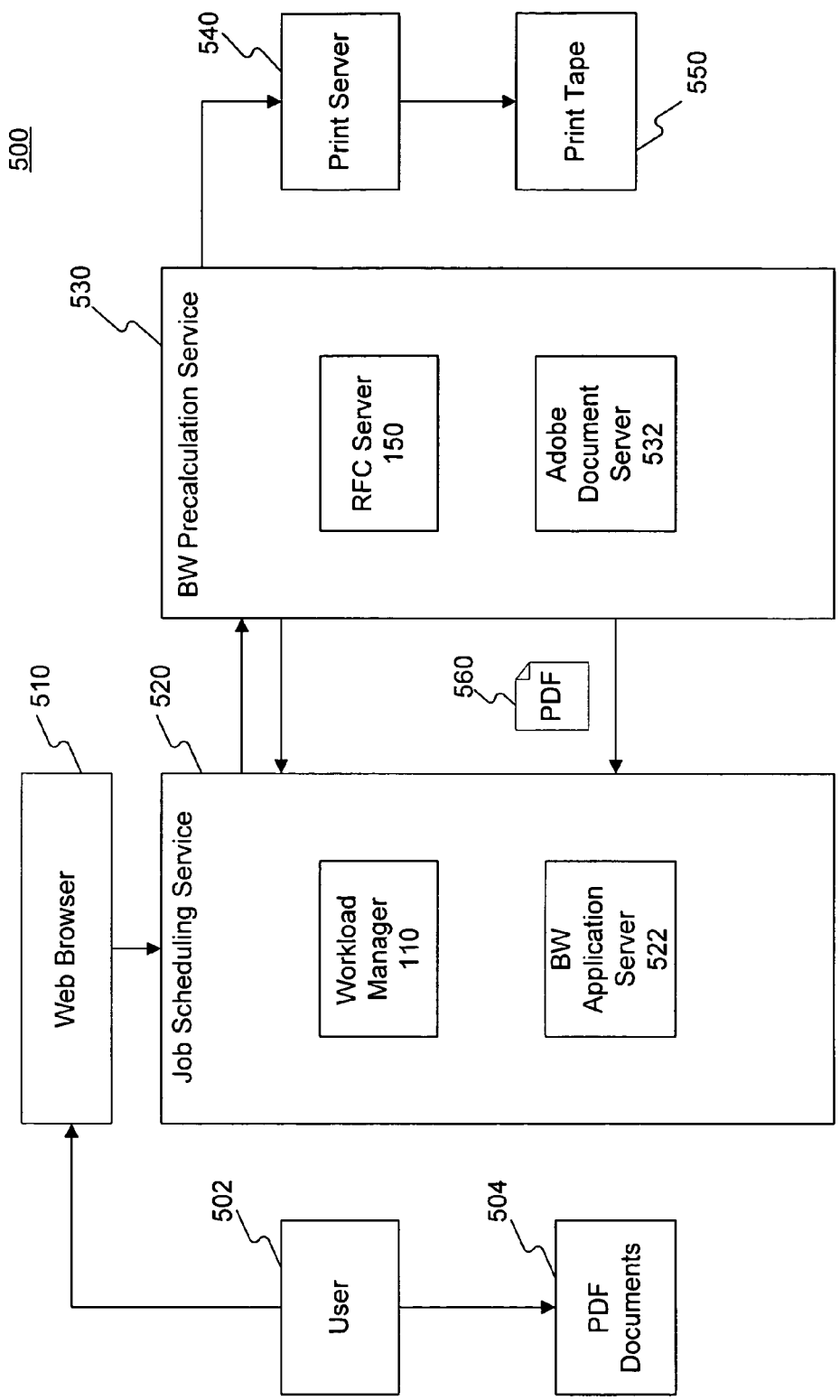
FIG. 5 shows a schematic diagram of an exemplary system for performing mass printing, consistent with an embodiment of the present invention.

FIG. 5 shows a schematic diagram 500 of an exemplary system for performing mass printing, consistent with an embodiment of the invention. The exemplary system 500 of FIG. 5 may be implemented to perform, for example, a method consistent with that described above with regard to FIG. 4.

As shown in FIG. 5, a user 502 may access existing documents, such as PDF documents 504 stored in a user's directory. The user's directory may store documents locally or remotely. For example, in one embodiment consistent with the invention, a user accesses PDF documents 504 over a network that are stored on a server.

User 502 may use a web browser 510 to access a website providing services for mass printing, such as functionality for generating or scheduling a mass report. For example, using web browser 510, user 502 may access a job scheduling service 520. Job scheduling service 520 may incorporate elements discussed earlier with respect to FIGS. 1 and 2. For example, job scheduling service 520 includes workload manager 110 and a BW application server 522, such as a business warehouse (BW) application server available from SAP, AG (Walidorf, Germany). Workload manager 110, may manage, schedule, and generate reports that are specified by user 502 working at web browser 510. User 502 may select reports, flag reports for printing, set parameters for reports, and/or vary reports. For example, when a user selects parameters for a report, the user may select and specify parameters that define the technical content of the report, including data fields that the report will contain and any calculations that are to be made on the data. Users also have the option of loading a report that has already been saved. Data used to generate a report may be stored, for example, in BW application server 522, or other servers (not shown) accessible over a network.

Once user 502 has specified a report, workload manager 110 may distribute a pre-calculation process to a BW pre-calculation service 530. For example, print parameters may be transferred to BW pre-calculation service 530. A standard RFC connection using an API, such as the SAP API, may be used when transferring the print parameters. Pre-calculation service 530 may include RFC server 150 and an Adobe document server 532. As discussed earlier with respect to FIG. 1, RFC server 150 may be used to pre-calculate workbooks using data supplied by workload manager 110. Print parameters may include specifications or information on how to format a report and whether the report should be prepared as, for example, a PDF file. The print parameters may also indicate whether a report should be saved to a user's favorites directory, printed, saved to a report tape, or transmitted by e-mail.

Workbooks are pre-calculated by the pre-calculation service 530 and saved by RFC server 150. Preliminary calculation capacities may be based on existing products or methods delivered as part of, for example, components of a BEx Broadcaster, a software solution commercially available from SAP AG (Walldorf, Germany). The pre-calculation workbooks may then be saved in a temporary directory and XLS files are grouped or given bookmarks by Adobe document server 532. Adobe document 532 then generates a PDF file, which may be returned to BW application server 522.

For example, according to schematic diagram 500 shown in FIG. 5, XLS files are converted into a PDF file 560. Generation of PDF file 560 may be accomplished through the use of PostScript printer description language provided by the Adobe document server 532. Consistent with the invention, PDF files may be created with Adobe Acrobat or other programs, and can be viewed with Adobe Acrobat Reader and other PDF reader programs. PDF file 560 may also be grouped automatically and sent to, for example, a print server 540 or a print tape 550. Print server 540 may print the report immediately and print tape 550 may store the report. Accordingly, a user may print the report, save the report to a print tape, or access the report from a directory.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML; or HTML with included Java applets or in SAP-R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for mass printing using a data processing system, the method comprising:
    electronically receiving a plurality of data parameters of a hierarchical-structured display, wherein the data parameters specify data to be included in a report;
    electronically receiving, before generating the report, a plurality of print parameters, the print parameters specifying at least a format of the report, a file type of the report, and a storage location for the report;
    electronically retrieving, from a database, mass data based on at least the data parameters;
    generating, by a first server, a pre-calculated workbook comprising calculated results of calculations performed on the retrieved mass data, the pre-calculated workbook comprising the calculated results in a file type of a spreadsheet program or database format; and
    transferring, according to a schedule specified by a scheduling module of the first server, a process to a second server, wherein the second server converts the pre-calculated workbook from the file type of the spreadsheet program or database format into the specified file type of the report, the report comprises the calculated results in the specified format, and the report is stored to the specified storage location.

2. The method of claim 1, wherein the mass data is stored in workbooks that are arranged in a hierarchical directory.

3. The method of claim 2, wherein the hierarchical directory is accessible by a user through a graphical user interface (GUI).

4. The method of claim 1, wherein a graphical user interface (GUI) enables a user to specify the data parameters.

5. The method of claim 1, wherein the second server is a remote procedure call (RFC) server and the specified file type of the report is a portable data format (PDF) file.

6. The method of claim 1, further comprising:
    specifying, using a graphical user interface (GUI), the schedule that the schedule modeling uses to determine when to generate the report.

7. The method of claim 1, wherein the storage location is a directory that is accessible over a network.

8. The method of claim 7, further comprising:
    transmitting a notification to a user indicating the directory where the report is stored.

9. A system for mass printing, the system comprising:
a graphical user interface, the graphical user interface enabling a user to:
  select a plurality of data parameters of a hierarchical-structured display, wherein the data parameters specify data to be included in a report, and
  specify a plurality of print parameters, wherein the print parameters specify at least a format of the report, a file type of the report, and a storage location for the report;
a database storing mass data;
a first server comprising a scheduling module, the first server:
  retrieving the mass data from the database based on at least the data parameters and a schedule specified by the scheduling module; and
  generating a pre-calculated workbook comprising calculated results of calculations performed on the retrieved mass data, the pre-calculated workbook comprising the calculated results in a file type of a spreadsheet program or database format; and
a second server that receives a process according to the schedule, and converts the pre-calculated workbook from the file type of the spreadsheet program or database format into the specified file type of the report, wherein the report comprises the calculated results in the specified format, and the second server electronically delivers the report to the specified storage location.

10. The system of claim 9, wherein the mass data is stored in workbooks that are arranged in a hierarchical directory.

11. The system of claim 9, wherein the second server is a remote procedure call (RFC) server.

12. The system of claim 11, wherein the specified file type of the report is a portable data format (PDF) file.

13. The system of claim 9, wherein the report is generated according to a data and a time specified by the scheduling module.

14. The system of 13, wherein the generated report is stored as a portable data format (PDF) file.

15. The system of claim 14, wherein the PDF is accessible through a favorites directory of a user.

16. A non-transitory computer-readable storage medium comprising programmable instructions adapted to perform a computer-implemented method for mass printing using a data processing system, the method comprising:
  electronically receiving a plurality of data parameters of a hierarchical-structured display, wherein the data parameters specify data to be included in a report;
  electronically receiving, before generating the report, a plurality of print parameters, the print parameters specifying at least a format of the report, a file type of the report, and a storage location for the report;
  electronically retrieving, from a database, mass data based on at least the data parameters;
  generating, by a first server, a pre-calculated workbook comprising calculated results of calculations performed on the retrieved mass data, the pre-calculated workbook comprising the calculated results in a file type of a spreadsheet program or database format; and
  transferring, according to a schedule specified by a scheduling module of the first server, a process to a second server, wherein the second server converts the pre-calculated workbook from the file type of the spreadsheet program or database format into the specified file type of the report, the report comprises the calculated results in the specified format, and the report is stored to the specified storage location.

17. The non-transitory computer-readable storage medium of claim 16, wherein the mass data is stored in workbooks that are arranged in a hierarchical directory.

* * * * *